(12) United States Patent
Mildner et al.

(10) Patent No.: US 9,914,372 B2
(45) Date of Patent: Mar. 13, 2018

(54) MOTOR VEHICLE SEAT ARRANGEMENT

(71) Applicant: GM GLOBAL TECHNOLOGY OPERATIONS LLC, Detroit, MI (US)

(72) Inventors: Udo Mildner, Ruesselsheim (DE); Frank Leopold, Rüsselsheim (DE); Lothar Teske, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 43 days.

(21) Appl. No.: 15/136,221

(22) Filed: Apr. 22, 2016

(65) Prior Publication Data

US 2016/0311343 A1    Oct. 27, 2016

(30) Foreign Application Priority Data

Apr. 24, 2015 (DE) .................. 10 2015 005 296

(51) Int. Cl.
| | |
|---|---|
| *A47C 1/00* | (2006.01) |
| *B60N 2/07* | (2006.01) |
| *B60N 2/16* | (2006.01) |
| *B62D 25/20* | (2006.01) |
| *B60N 2/427* | (2006.01) |
| *B60N 2/68* | (2006.01) |

(52) U.S. Cl.
CPC ......... *B60N 2/0705* (2013.01); *B60N 2/0732* (2013.01); *B60N 2/1615* (2013.01); *B62D 25/20* (2013.01); *B60N 2/07* (2013.01); *B60N 2/42709* (2013.01); *B60N 2/68* (2013.01); *B60N 2/686* (2013.01)

(58) Field of Classification Search
CPC ...... B60N 2/07; B60N 2/0732; B60N 2/0705; B60N 2/1615; B60N 2/68; B60N 2/686; B60N 2/42709

USPC ... 297/344.11, 216.1, 216.2, 452.55, 452.18, 297/452.39

See application file for complete search history.

(56) References Cited

U.S. PATENT DOCUMENTS

| | | | | |
|---|---|---|---|---|
| 5,722,731 | A * | 3/1998 | Chang | B60N 2/0705 |
| | | | | 297/344.1 |
| 5,868,472 | A * | 2/1999 | Grilliot | B60N 2/015 |
| | | | | 297/216.1 |
| 7,533,932 | B2 * | 5/2009 | Kawasaki | B60N 2/073 |
| | | | | 297/216.1 |
| 8,899,542 | B2 * | 12/2014 | Balin | B60N 2/072 |
| | | | | 248/424 |
| 2003/0116999 | A1 * | 6/2003 | Fujita | B60N 2/4228 |
| | | | | 297/216.13 |
| 2005/0099041 | A1 * | 5/2005 | Becker | B60N 2/002 |
| | | | | 297/217.2 |

(Continued)

FOREIGN PATENT DOCUMENTS

| | | |
|---|---|---|
| DE | 1911879 U | 3/1965 |
| DE | 3607855 A1 | 9/1987 |

(Continued)

OTHER PUBLICATIONS

German Patent Office, German Search Report for German Application No. 102015005296.9, dated Nov. 12, 2015.

*Primary Examiner* — Chi Q Nguyen
(74) *Attorney, Agent, or Firm* — Lorenz & Kopf LLP

(57) ABSTRACT

A motor vehicle seat arrangement is provided with two spaced apart seat rails, to which two spaced apart cross profiles are rigidly fastened. A seat structure is joined with the cross profiles.

15 Claims, 5 Drawing Sheets

(56) References Cited

U.S. PATENT DOCUMENTS

| | | | |
|---|---|---|---|
| 2005/0168042 A1* | 8/2005 | Williamson | B60N 2/01508 297/452.18 |
| 2005/0275273 A1* | 12/2005 | Nakamura | B60N 2/68 297/440.21 |
| 2006/0202513 A1 | 9/2006 | Matsuda | |
| 2012/0280104 A1* | 11/2012 | Veen | B60N 2/0232 248/671 |
| 2014/0167471 A1* | 6/2014 | Haller | B60N 2/508 297/344.22 |
| 2015/0021965 A1* | 1/2015 | Ellerich | B60N 2/682 297/283.1 |
| 2015/0231992 A1* | 8/2015 | Gundall | B60N 2/162 297/344.15 |

FOREIGN PATENT DOCUMENTS

| | | |
|---|---|---|
| DE | 10143881 A1 | 3/2003 |
| DE | 102007003286 A1 | 7/2008 |
| DE | 102009045065 A1 | 3/2011 |
| DE | 102012210536 A1 | 12/2013 |
| EP | 0028564 A1 | 5/1981 |
| EP | 0290408 B1 | 9/1992 |
| EP | 0949138 A2 | 10/1999 |

\* cited by examiner

MOTOR VEHICLE SEAT ARRANGEMENT

CROSS-REFERENCE TO RELATED APPLICATION

This application claims priority to German Patent Application No. 102015005296.9, filed Apr. 24, 2015, which is incorporated herein by reference in its entirety.

TECHNICAL FIELD

The present disclosure pertains to a motor vehicle seat arrangement, a motor vehicle with the motor vehicle seat arrangement, as well as a method for manufacturing the motor vehicle seat arrangement or the motor vehicle.

BACKGROUND

EP 0 290 408 B1 discloses an arrangement with a base frame that can be linearly displaced in rails bolted with a vehicle floor. Tubular reinforcing elements are joined with a seat frame, and opposite a seat height adjuster are hinged with the base frame.

SUMMARY

In one aspect of the present disclosure, a motor vehicle seat arrangement exhibits at least two spaced apart seat rails, on which at least two spaced apart cross profiles are or will be fastened rigidly or without hinges, in particular (macroscopically) immovably, and a seat structure that is or will be joined with the cross profiles. Because the cross profiles are rigidly, in particular immovably or fixedly, attached to the seat rails, the cross profiles can in one embodiment advantageously convey loads between the seat rails.

In an embodiment, one or more of the cross profiles are fastened to one or more of the seat rails, either materially joined such as by welding or by adhesive bonding, and/or frictionally joined such as by bolting or riveting. In an embodiment, this makes it possible to improve the load transmission and/or manufacture or assembly.

In an embodiment, the seat structure can exhibit a frame-shaped seat (shell or surface) element. In an embodiment, the seat structure is a seat structure of a front seat. In an embodiment, in particular the behavior during a side pole impact or test can be improved in this way, in which a pole is situated at the height of a hip point of a front passenger.

In an embodiment at least one of the cross profiles exhibits across section that is open in the circumferential direction over its entire length or in one or more partial sections of its length, or a cross sectional profile open in the circumferential direction. In other words, at least one of the cross profiles is in one embodiment across profile open in the circumferential direction over its entire length or only in one or more partial sections of its length, or exhibits a slit or gap or two edges separated, in particular spaced apart, from each other, which extends in the longitudinal direction of the cross profile. In an embodiment, this makes it possible to improve the deformation behavior.

Additionally or alternatively, at least one of the cross profiles may be roll-shaped or roll formed, in particular according to DIN 8586. In an embodiment, this makes it possible to improve manufacture and/or the deformation behavior of the cross profiles.

In an embodiment, at least one of the open cross sections or at least one of the open cross sectional profiles exhibits two legs and a web that joins the latter together. In a further development, the legs together form an angle measuring at most 10°; or in other words the legs can at least essentially be parallel. The open cross sectional profile can at least essentially be rectangular with an open or missing rectangle side. In another further development, the legs are curved relative to each other or together form an angle measuring at least 20°. In other words, the open cross sectional profile can at least essentially be trapezoidal with an open or missing trapezoid side. In an embodiment, at least one of the open cross sections or at least one of the open cross sectional profiles exhibits an least essentially constant, curved area, which in a further development extends over an angular range of at least 90°, and in particular at least 160°. In other words, the open cross sectional profile can at least essentially be arcuate and may generally form a half round or semicircular. In an embodiment, such open cross sections or cross sectional profiles make it possible to improve manufacture and/or the deformation behavior.

In an embodiment, at least one of the cross profiles exhibits an essentially constant cross section over its entire length. As a result, manufacture can be improved in an embodiment.

In an embodiment, the seat structure is or will be hinged to the cross profiles via a seat height adjuster. In an embodiment, arranging the seat height adjuster between the cross profiles rigidly joined with the seat rails and the seat structure makes it possible to improve load transmission and/or the deformation behavior.

In a further development, the seat height adjuster exhibits at least two structurally identical retainers, in particular a left and a structurally identical right retainer and/or a front and a structurally identical rear retainer, i.e., in particular a front left and a structurally identical front right retainer and/or a rear left and a structurally identical rear right retainer. In an embodiment, this makes it possible to reduce the number of different components, and thereby improve their manufacture, storage and/or assembly.

In a further development, the seat height adjuster, in particular a retainer of the seat height adjuster, may be fastened to the cross profiles or one of the cross profiles either materially joined via welding or adhesive bonding, and/or frictionally jointed via bolting or riveting. In an embodiment, this makes it possible to improve the load transmission and/or manufacture or assembly.

In an embodiment, the seat rails extend in the longitudinal rail direction, in particular in the longitudinal vehicle direction, in particular as a single piece or part, at least from the one cross profile to the other cross profile, in particular beyond the spaced apart cross profiles on one or both sides. In an embodiment, this makes it possible to improve the load transfer and/or guidance. In like manner, at least one of the seat rails can also exhibit several seat rail parts spaced apart from each other in the longitudinal rail direction, wherein the cross profiles can then be spaced apart in the longitudinal rail direction in particular by the seat structure. In an embodiment, at least one of the seat rails exhibits a cross section that is at least essentially constant and/or open in the circumferential direction in the longitudinal rail direction over its entire length or (only) one or more (partial) sections of its length, and/or is at least essentially straight.

In an embodiment, one of the cross profiles is arranged in the longitudinal rail direction between another of the cross profiles and a rotational axis of a rotatable/pivoted backrest structure; in particular, the rotational axis of the rotatable/pivoted backrest structure in the longitudinal vehicle direction can be arranged behind the cross profiles or offset toward a vehicle rear in relation thereto. In an embodiment, this makes it possible to improve the crash behavior, in particular given a post impact or test.

In an aspect of the present disclosure, a motor vehicle, in particular a passenger car, exhibits two parallel floor rails spaced apart from each other in particular in a transverse vehicle direction, along with a motor vehicle seat arrangement described herein, the seat rails of which are guided on the floor rails in an axially displaceable, in particular positive, manner. In an embodiment, the seat rows are guided in the floor rails or engage into the latter. In other words, a respective seat rail is partially enveloped in the circumferential direction by the floor rails guiding them. In another embodiment, the seat rails are guided on the floor rails or respectively envelop the latter at least partially in the circumferential direction.

In an embodiment, at least one of the seat rails or seat rail parts is guided on one of the floor rails in a torque-proof or rotation-proof or purely axially or linearly displaceable manner. In an embodiment, the displaceability and/or force transfer can be improved in this way.

In an embodiment, the seat and/or floor rails at least essentially extend in the longitudinal vehicle direction or form an angle with the latter measuring at most 10°. Additionally or alternatively, the cross profiles at least essentially extend in a transverse vehicle direction or form an angle with the latter measuring at most 10°. Additionally or alternatively, at least one of the seat rails together with at least one of the cross profiles rigidly fastened thereto, in particular the seat rails together with the cross profiles fastened thereto, each forming an angle of between 75° and 105°, in particular an essentially right angle. In an embodiment, this makes it possible to improve the force transfer and/or deformation behavior.

In an embodiment, the motor vehicle exhibits a body structure with a central or longitudinal tunnel, wherein one of the floor rails is or will be fastened to the central tunnel, in particular to an especially horizontal step of the central tunnel, in particular frictionally joined, in particular via bolting or riveting, and/or materially joined, in particular via welding or adhesive bonding.

Additionally or alternatively, the body structure can exhibit in particular an inner vehicular rocker panel profile. One or the other floor rails may be fastened to the rocker panel profile, in particular to an in particular horizontal step of the rocker panel profile, in particular frictionally joined, in particular via bolting or riveting, and/or materially joined, in particular via welding or adhesive bonding. In an embodiment, this makes it possible to improve load transfer and/or assembly.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
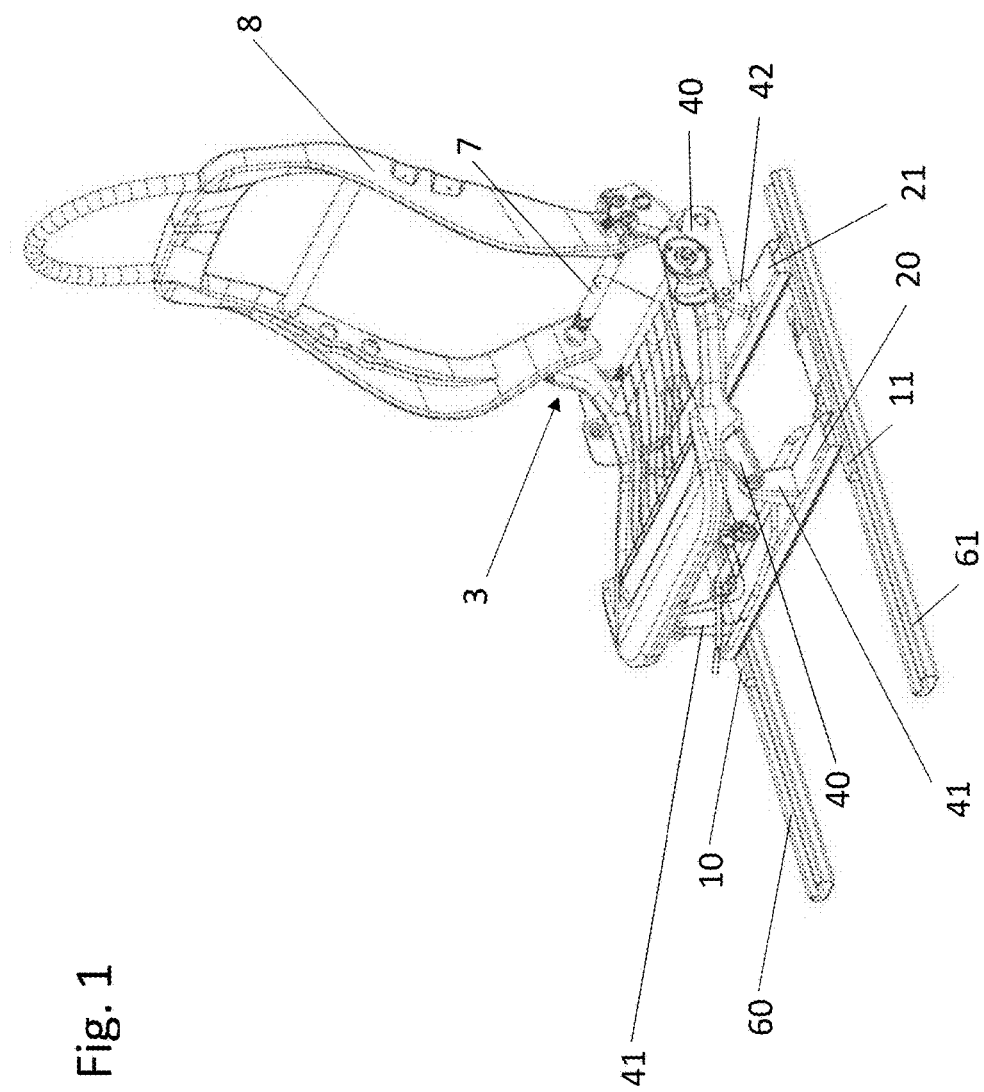
FIG. 1 shows a motor vehicle seat arrangement according to an embodiment of the present disclosure in a perspective view.
Figure 2:
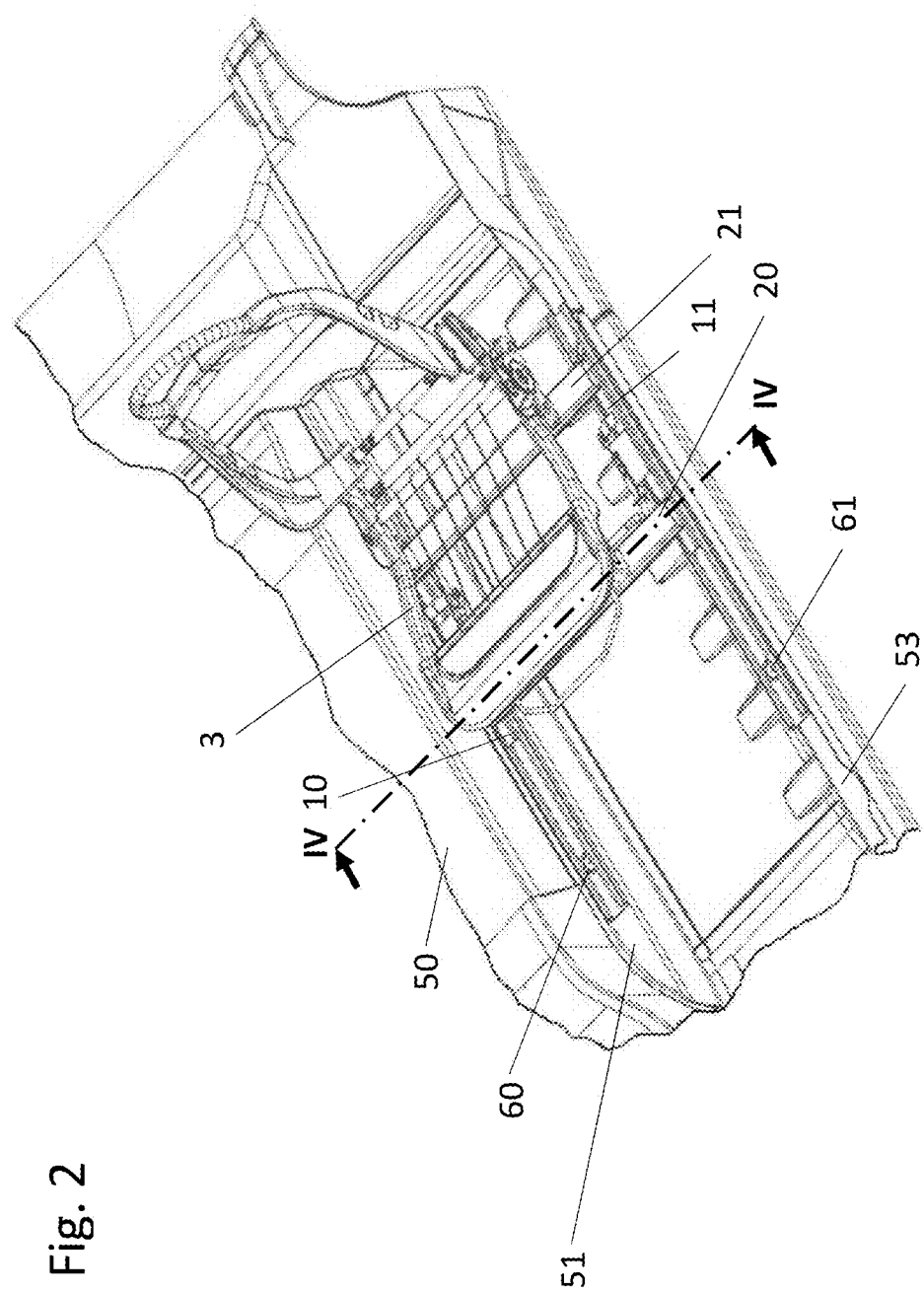
FIG. 2 shows part of a motor vehicle according to an embodiment of the present disclosure with the motor vehicle seat arrangement in a perspective view.

FIG. 2 shows part of a motor vehicle according to an embodiment of the present disclosure with the motor vehicle seat arrangement in a perspective view, while FIG. 1 shows the motor vehicle seat arrangement. The motor vehicle seat arrangement exhibits two spaced apart seat rails 10, 11, to which two spaced apart cross profiles 20, 21 are rigidly fastened, and a seat structure 3 that is joined with the cross profiles 20, 21. The seat structure 3 exhibits, in particular is, a frame-shaped seat shell or surface element of a front seat. The cross profiles 20, 21 each exhibit a cross section that is constant over their entire length and open in the circumferential direction or an open (cross sectional) profile, and are roll (re)shaped.

Figure 5A:
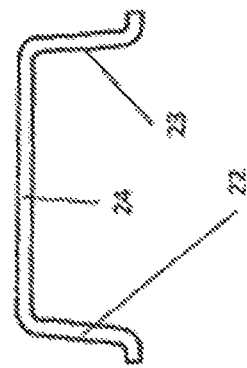
FIG. 5A is a cross sectional profile of a cross profile of the motor vehicle seat arrangement.
Figure 5B:
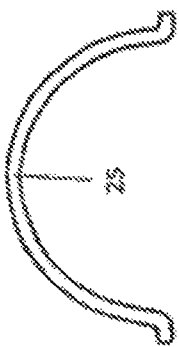
FIG. 5B is a cross sectional profile of a cross profile of a motor vehicle seat arrangement according to another embodiment of the present disclosure.
Figure 5C:
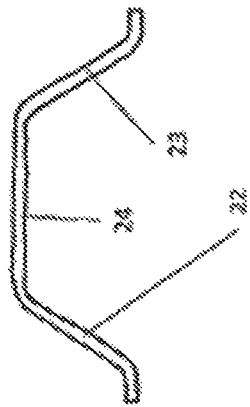
FIG. 5C is a cross sectional profile of a cross profile of a motor vehicle seat arrangement according to another embodiment of the present disclosure.

In the exemplary embodiment on FIG. 1-5A, the open, rectangular cross sections or cross (sectional) profiles, as visible in particular on FIG. 5A, each exhibit two parallel legs 22, 23 and a web 24 joining the latter together. In another embodiment according to FIG. 5C, which otherwise coincides with the embodiment described with reference to FIG. 1-4, the legs 22, 23 of the trapezoidal cross sections or cross (sectional) profiles are inclined toward each other, as evident from FIG. 5C. In another embodiment according to FIG. 5B, which otherwise coincides with the embodiment described with reference to FIG. 1-4, the half-round or circular cross sections or cross (sectional) profiles, as visible on FIG. 5B, exhibit a constantly curved area 25, which extends over an angular range of about 180°.

The seat structure 3 is hinged to the cross profiles 20, 21 via a seat height adjuster 40. The seat height adjuster 40 exhibits a front left and a structurally identical front right retainer 41, and a rear right and structurally identical rear right retainer 42. The retainers 41, 42 of the seat height adjuster 40 are fastened to the cross profiles 20, 21 materially, in particular via welding and/or adhesive bonding, or frictionally, in particular via riveting.

Figure 3:
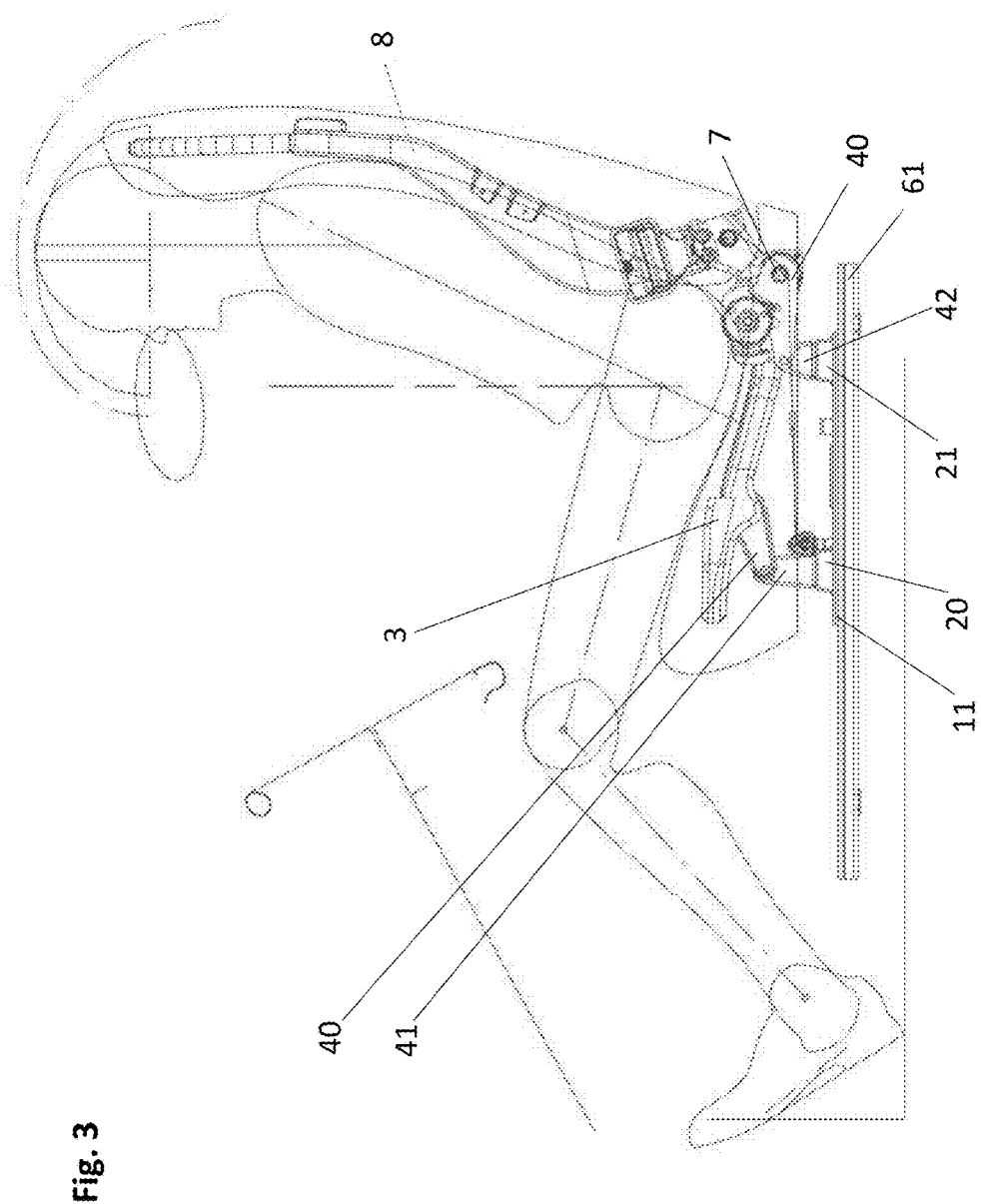
FIG. 3 shows the part of the motor vehicle in a side view.
Figure 4:
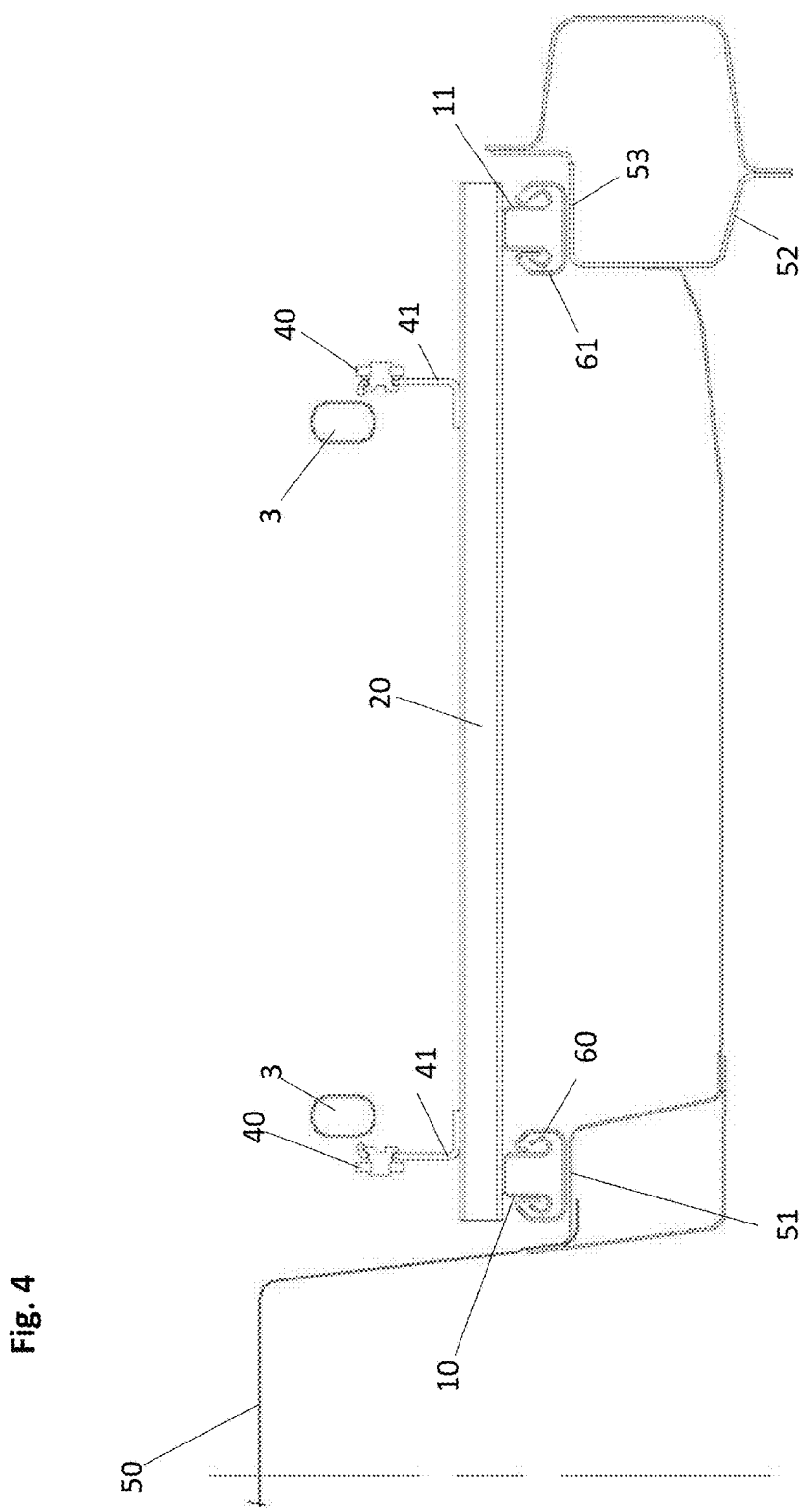
FIG. 4 is a section along the line IV-IV on FIG. 2.

As evident in particular in FIGS. 1 and 3, the seat rails 10, 11 extend in the longitudinal rail or vehicle direction as a single piece from the front cross profile 20 up to the rear cross profile 21, as well as on one side beyond the front cross profile 20. The motor vehicle exhibits a body structure with a central or longitudinal tunnel 40 with a horizontal step 51 (see FIG. 4), to which a floor rail 60 is fastened via bolting, riveting, welding or adhesive bonding.

In addition, the body structure exhibits an inner rocker panel profile 52 with a horizontal step 53 (see FIG. 4), to which another floor rail 61 is fastened via bolting, riveting, welding or adhesive bonding. As evident in particular on FIG. 4, the parallel seat rails 10, 11 are guided in the parallel floor rails 60, 61 in a positive, axially displaceable and torque-proof manner.

As evident particular in FIG. 3, a rotational axis 7 over which a backrest structure 8 is rotatably mounted is offset in the longitudinal vehicle direction behind the two cross profiles 20, 21 or in relation thereto toward a vehicle rear (to the right on FIG. 3), so that the rear cross profile 21 is situated between the front cross profile 20 and rotational axis 7.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle seat arrangement comprising two seat rails arranged in spaced apart relation, two cross profiles arranged in spaced apart relation and rigidly fastened to the two seat rails, a seat structure joined with the cross profiles, two spaced apart floor rails, and a body structure having a structural element selected from the group consisting of a central tunnel and a rocker panel profile, wherein one of the floor rails is detachably fastened to the structural element, wherein at least one section of at least one of the cross profiles exhibits a cross section that is open in a circumferential direction, and wherein the seat rails are guided on the floor rails in an axially displaceable manner.

2. The motor vehicle seat arrangement according to claim 1, wherein the at least one section of at least one of the cross profiles is roll reshaped.

3. The motor vehicle seat arrangement according to claim 1, wherein the open cross section comprising two legs and a web joining the two legs together.

4. The motor vehicle seat arrangement according to claim 3, wherein the two legs are parallel.

5. The motor vehicle seat arrangement according to claim 3, wherein the two legs are inclined toward each other.

6. The motor vehicle seat arrangement according to claim 3, wherein the two legs and the web form an arcuate section.

7. The motor vehicle seat arrangement according to claim 1, further comprising a seat height adjuster hingedly connection the seat structure to the cross profiles.

8. The motor vehicle seat arrangement according to claim 7, wherein the seat height adjuster comprises at least two structurally identical retainers fastened to the cross profiles.

9. The motor vehicle seat arrangement according to claim 1, wherein the seat rails extend in a longitudinal rail direction at least from one of the cross profiles up to the other cross profile on at least one side beyond the spaced apart cross profiles.

10. The motor vehicle seat arrangement according to claim 9, wherein the seat rails extend beyond the spaced apart cross profiles on at least one side.

11. The motor vehicle seat arrangement according to claim 1, further comprising a rotatable backrest structure, wherein one of the cross profiles is situated in the longitudinal rail direction between the other cross profile and a rotational axis of the backrest structure.

12. A motor vehicle seat arrangement comprising two seat rails arranged in spaced apart relation, two cross profiles arranged in spaced apart relation and rigidly fastened to the two seat rails, a seat structure joined with the cross profiles, two spaced apart floor rails wherein the seat rails are guided on the floor rails in an axially displaceable manner, and a body structure having a central tunnel and a rocker panel profile, wherein one of the floor rails is detachably fastened to the central tunnel and the other floor rail is detachably fastened to the rocker panel profile.

13. The motor vehicle according to claim 12, wherein the seat rails are fastened to the floor rails in an axially displaceable manner.

14. The motor vehicle according to claim 12, wherein the cross profiles are fastened to the seat rails and the seat structure is joined with the cross profiles.

15. A motor vehicle comprising two seat rails arranged in spaced apart relation, two cross profiles arranged in spaced apart relation and rigidly fastened to the two seat rails, a seat structure joined with the cross profiles, two spaced apart floor rails wherein the seat rails are guided on the floor rails in an axially displaceable manner, and two spaced apart floor rails, wherein the seat rails are guided on the floor rails in an axially displaceable manner, and wherein one of the floor rails is detachably fastened to a central tunnel and the other of the floor rails is detachably fastened to a rocker panel profile.

* * * * *